United States Patent [19]

Wadley et al.

[11] Patent Number: 4,548,134
[45] Date of Patent: Oct. 22, 1985

[54] DOT IMAGE BUFFER AND DOT SEQUENCE SCRAMBLER FOR DOT MATRIX LINE PRINTER

[75] Inventors: Donald K. Wadley; Philip Gordon, both of Boise, Id.

[73] Assignee: Hewlett Packard Company, Palo Alto, Calif.

[21] Appl. No.: 580,392

[22] Filed: Feb. 15, 1984

[51] Int. Cl.⁴ .............................................. B41J 3/12
[52] U.S. Cl. .............................. 101/93.04; 101/93.05; 400/121; 340/800; 328/104
[58] Field of Search ............... 101/93.04, 93.05, 93.09; 400/121, 124; 328/104, 105; 377/64, 75; 178/15, 30; 340/744, 800, 801

[56] References Cited

U.S. PATENT DOCUMENTS

| | | | |
|---|---|---|---|
| 3,789,969 | 2/1974 | Howard et al. | 400/124 |
| 3,833,891 | 9/1974 | Howard et al. | 101/93.05 X |
| 3,893,558 | 7/1975 | Fulton et al. | 101/93.05 X |
| 4,077,336 | 3/1978 | Talvard et al. | 101/93.05 |
| 4,169,684 | 10/1979 | Blom | 400/124 |
| 4,279,199 | 7/1981 | Blanco et al. | 400/124 |
| 4,312,045 | 1/1982 | Jean et al. | 400/124 X |
| 4,480,541 | 11/1984 | Grummett | 101/93.04 |

Primary Examiner—Paul T. Sewell
Attorney, Agent, or Firm—Leslie G. Murray

[57] ABSTRACT

In a dot matrix printer, a single main shift register is loaded in the non-printing time during which a transversely shuttling print bar is changing direction with the complete dot row to be printed on the next printing pass of the print bar. A custom VLSI integrated circuit comprising a serial loaded 2772-bit main shift register and a parallel loaded 132-bit bidirectional parallel-to-serial output shift register is provided. The main shift register has one storage cell for each dot that can be printed across the dot row during a single pass of the print bar. Parallel output taps physically placed along the main shift register provide simultaneous serial output of the storage cells between each tap. The number of bits stored between each output tap is the number of dots each individual print hammer can print on a single pass of the print bar. The 132-bit output shift register is utilized to limit the number of package pins and to compensate for the direction of motion of the print bar. The parallel outputs of the main shift register comprise the parallel inputs of the output shift register. Dot Generation Logic is provided to map printable characters and data through dot image character sets and to load the 2772-bit main shift register with the exact dot image of the data to be printed during the next pass of the print bar.

13 Claims, 16 Drawing Figures

DOT IMAGE BUFFER AND DOT SEQUENCE SCRAMBLER FOR DOT MATRIX LINE PRINTER

BACKGROUND OF INVENTION

1. Field of Invention

This invention relates generally to high-speed printers and more particularly to dot generation circuitry in a dot matrix printer.

2. Description of Prior Art

Dot matrix impact printers employing a laterally shuttling print bar convert data provided by a host computer or word processor to characters or graphics formed from rows of dots printed on paper. The data is input to the printer through an input/output system, filtered for control and other non-printable characters and formatted by a microprocessor, and then converted to dots and input to the print mechanism in the correct order by a subsystem called the Dot Generation Logic. The purpose of the Dot Generation Logic is to map the American Standard Code for Information Interchange (ASCII) coded (or otherwise coded) data bytes into their appropriate pictorial dot image and to format this data to drive the print mechanism. Dot Generation Logic in prior art line printers may generally comprise a buffer memory of all active characters to be printed on the print line, complex state machine logic, a dot image buffer, arithmetic capability, programmable dot extraction logic capability, and the character set dot image ROMs.

Most contemporary dot matrix impact line printers have 132, 66, 44, 33, or 17 print hammers evenly spaced along the shuttling print bar at intervals of 0.1", 0.2", 0.3", 0.4", or 0.8" respectively. Conversion of ASCII coded information into the proper dot images is not difficult itself, but formatting and sequencing the dots to the print hammers can be troublesome. Although a dot matrix line printer appears to print a single dot row at a time, the hammer driving circuits for a laterally shuttling print bar can not collectively accept simple raster scan dot data, as a cathode ray tube does. As the print bar on, say a 132-hammer line printer moves from one extreme position to the other, each hammer passes across its exclusive 0.1" print area. While each hammer itself prints as a 0.1" mini-raster scan, the print bar, when viewed as a unit, appears as a configuration of 132 disjointed raster scans. Dot image data must somehow be sequenced to the hammers to compensate for the physical print bar configuration. If this print bar covers 13.2" of paper (an industry standard) at a dot density of 100 dots per inch, the first 132 dots printed simultaneously as the print bar passes across the first printable position on the paper are the dots number 0, 10, 20, ... 1310. The next 132 dots to be simultaneously printed will be 1, 11, 21, ... 1311, and so on to the final 132 dots of 9, 19, 29, ... 1319. Clearly, routing and sequencing considerations are an important task of the dot generation logic.

Spacing between print hammers on simple dot matrix line printers is an exact or easily obtainable multiple of the printable horizontal character densities (i.e. character pitches). Dot generation logic to print a row of 10-pitch characters (10 characters per inch or one character per 0.1") is quite simple for a printer with print hammer spacing an integer multiple of 0.1" when the width of each character cell fits exactly within the reach of a single print hammer. Such dot generation logic could also print, for example, 15-pitch characters if the print hammers were spaced either 0.2", 0.4" or 0.8"; or 13⅓- or 16⅔-pitch characters if its hammers were spaced 0.3" apart. The ASCII to dot conversion and dot sequencing algorithm is simple since all hammers will print the same dot column of any active characters at the same time. Each printable character is mapped through its dot image ROM which usually yields eight bits. Then, based upon the character column being printed, one of the bits is extracted and passed toward the hammer driver logic. Each successive printable character is similarly mapped and a single bit extracted and passed toward the hammer driver logic.

Enhancements to the dot generation are required to print character text at a density that does not perfectly fit the explicit hammer spacing. Dots from characters to be printed simultaneously can originate from different columns within the character cells. Modulo arithmetic capability is often added to supplement the general accessing logic required for the simplest line printer to allow for processing and simultaneously printing, for example, the first column of the first character, the third column of the second character, the fifth column of the third character, etc.

More complex logic is required if character pitches are changed within a print row. This capability is utilized in advanced data reporting and formatting and to print proportionally spaced text. Because there is no consistent pattern to the column addressing for the characters on the print row, either a dedicated microprocessor or more substantial arithmetic logic is required to keep track of changing character widths and dot positions across the paper, to queue up dots, and to send them in the proper sequence to the print hammers.

SUMMARY OF THE INVENTION

In accordance with the present invention, a single VLSI circuit comprising a serial loaded 2772-bit main shift register and a parallel loaded 132-bit bidirectional output shift register is provided. In a preferred embodiment, the invention is described in connection with a microprocessor-controlled dot matrix impact printer which includes a paper feed assembly, a laterally shuttling print bar with a plurality of print hammers mounted on it, the associated hammer drive electronics, a print bar position encoder (described in co-pending application, Ser. No. 551,662, filed on Nov. 10, 1983, entitled ENCODER SYSTEM FOR DOT MATRIX LINE PRINTER; by P. Luque and K. Wade assigned to the instant assignee), a platen, and a print ribbon drive assembly.

A single main shift register is fully loaded in the non-printing time during which the print bar is changing direction (i.e., turnaround). The main shift register has one storage cell for every dot that can be printed across the print row during a single pass of the print bar. The main shift register has 132 output taps evenly spaced along its length—one tap for each possible print hammer mounted on the print bar. The number of storage cells between the taps represents the number of dots an individual print hammer can print in a complete pass of the print bar. Each tap is routed to drive one print hammer. After the main shift register is loaded, the main shift register is clocked once each time the print hammers are fired, thereby shifting the next printable set of dots to the proper taps for the next print hammer firing sequence.

A 132-bit bidirectional parallel-to-serial output shift register is included on the VLSI chip to limit the number of package pins required and to compensate for the direction of motion of the print bar. On each and every rising edge of its clock the output shift register either shifts or loads depending on the level of a ground-true load enable line and a right/left direction line representing the direction of motion of the print bar. The parallel inputs to the 132-bit output shift register are the outputs of the 132 output taps from the main shift register.

An alternate embodiment utilizes a serial loaded, bidirectional 2772-bit main shift register. The bidirectional main shift register is similar to the unidirectional main shift register with the exception that it may be shifted in either direction. A 132-bit bidirectional parallel-to-serial output shift register is utilized to limit the number of package pins.

The Dot Generation Logic subsystem includes the 2772-bit main shift register, the 132-bit output shift register, character set ROMs, host printer microprocessor interface and a simple state machine embodying the necessary control logic. The state machine and processing logic of the Dot Generation Logic are contained in a semicustom CMOS gate array called the Dot Processor Chip. The role of the Dot Processor Chip is to load the 2772-bit main shift register with the exact image of the data to be printed on the paper during the next pass of the print bar.

The present invention has several advantages over the prior art. The state machine control and logic necessary to load the 2772-bit main shift register is no more complex than that required for the simplest line printer. Character cell dot image data are directly loaded into the register without requiring reformatting. Scrambling and sequencing the dots in proper order and orientation to be input to the print hammers is accomplished by the physical geometric placement of the taps along the register thereby minimizing computational time. Yet the most advanced features such as mixing character set pitches and proportional spacing are implicit in the design.

In the prior art dot generation logic system described above, the coded ASCII to dot conversion may be inefficient. Unless the character cells to be printed are exceptionally large, at most only one dot from each character will be printed at a given print bar position by the hammer. Character dot image memories are usually byte-wide ROMs, and hence yield eight bits per access. Dot generation logic that does not include buffering for the dot image row to be printed may access the same ROM address up to eight times for each character to be printed, extracting one bit at a time as consecutive firings of the print hammers are made. This may limit performance in high-speed or high dot density line printers. An image buffer that holds the entire line of dots is sometimes added to allow storage of all eight useful bits from each ROM access. Dot image buffers are a must when dedicated microprocessors are employed for the dot generation logic because microprocessors are much slower than algorithmic state machines. However, buffers are generally designed around standard RAM components that are four or eight bits wide, and neither the number of print hammers on a print bar nor the number of dots between adjacent hammers are exponentials of two (i.e 2, 4, 8, 16, etc.). Further, the widths of character cells (in dots) and the inherent horizontal dot density of the printer are rarely exponentials of two. This results in the standard RAM component requiring arithmetic addressing and single bit extraction logic that may be very complex and that requires great care to manage.

In the present invention there are no duplicative accesses of the dot image ROM. The main shift register acts as an ideal and complete line buffer exactly complementary to the geometry of the print bar. No arithmetic logic is required such as is the case when a standard RAM component is utilized to emulate a shift register.

As in some of the prior art designs, the print hammer fire signal will cause an interrupt, interaction, and information exchange between the host microprocessor and the Dot Generation Logic. In the present invention, once the main shift register is filled and the print bar turnaround interval is complete, print hammer fire signals from the print bar postion encoder take complete control of both the main shift register and output shift register. No frequent or regular interaction with the host microprocessor is required. This permits the use of a less expensive microprocessor system to achieve the same printer performance.

Prior to now large shift registers with taps have not been generally available from manufacturers. What large shift registers that are available and economical (512 to 2048 bits) are both serial input and output. A bipolar shift register, configured to emulate the present invention, would be a prohibitively expensive solution since available bipolar components are 8- to 16-bit maximum and hence would require 350 8-bit bipolar components.

In the preferred embodiment, the invention is utilized in dot matrix impact printers having a maximum resolution of 210 dots per inch and printing a line up to 13.2 inches long. Print bars having 132, 66, or 33 print hammers are easily compatible with the main shift register. While the invention will be particularly described and shown with reference to a preferred embodiment thereof, it will be understood by those skilled in the art that various changes in form and details may be made thereto without departing from the spirit and scope of the invention.

DESCRIPTION OF THE PREFERRED EMBODIMENT

The basic printing operation is the energizing and release of a cantilever steel tine (print hammer) by an electromagnet. The tips of the print hammers are drawn away from the print paper ("captured") by a small permanent magnet. To print a dot, an electromagnet is energized overcoming the complementary field of the permanent magnet, thus releasing or firing the hammer. When released, the hammer snaps forward and a hardened steel stylus welded near its tip impacts a print ribbon against the paper and a platen, printing a dot. The electromagnet is de-energized and the permanent magnet re-captures the print hammer as it rebounds from the paper and platen. To print a complete character, the hammer and its magnets are moved transversely to multiple dot positions, and dots are printed in the positions required by that character in that particular dot row of the dot matrix. The print paper is then advanced the distance required for one dot row, the hammer and its magnets reverse direction, and the next row of dots required for that character is printed.

Figure 1:
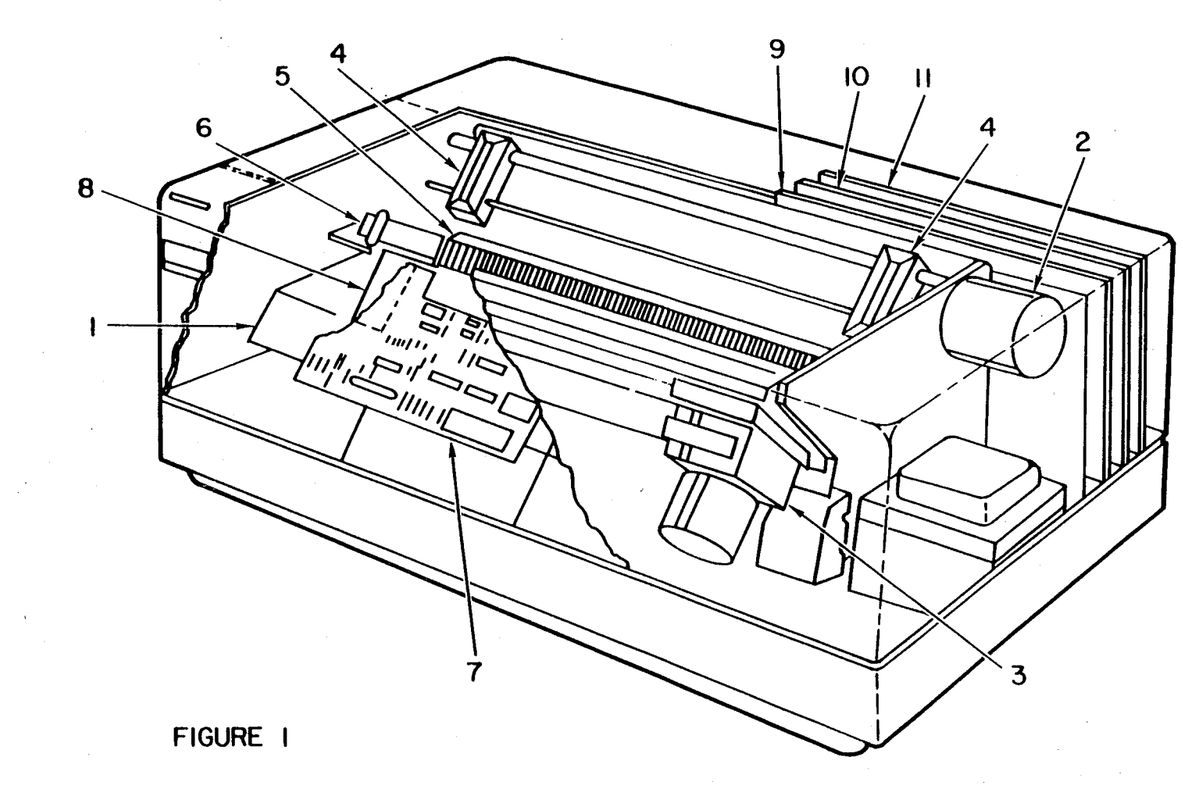
FIG. 1 is a cutaway view in perspective for purposes of illustration of a dot matrix impact printer which may be used in accordance with one preferred embodiment of the invention.

The preferred embodiment of the present invention is described in conjunction with a dot matrix impact printer illustrated in FIG. 1. The printer comprises a chassis 1 supporting a print bar 5 and a print paper stepping system generally comprised of a stepper motor 2 driving the paper moving tractors 4. All the print hammers (not shown) and their associated magnets (not shown) are linearly mounted along the print bar 5 in a "hammer bank." The print paper (not shown) is stepped one dot row at a time along a path between the hammer bank and a platen 6. A print ribbon (not shown) may be disposed between the print paper and the print bar 5. The ribbon motor assembly 3 draws the ribbon past the printing station defined by the hammer bank and the platen 6 to provide an adequate ink supply for printing and to facilitate even wear of the ribbon.

The print bar 5 is attached to the printer chassis 1 by two sets of stiff flexure springs (not shown) which permit lateral motion (transverse to the direction of paper advancement past the hammer bank) only of the print bar 5. A motor (not shown) drives the print bar and its attachment springs at, or near, the composite natural frequency. A linear position encoder 8 mounted on the left end of the moving print bar 5 provides signals representing the position of the moving print bar.

The dot matrix impact printer illustrated in FIG. 1 has 33 print hammers spaced on 0.4 inch centers. Another embodiment has 132 print hammers spaced on 0.1 inch centers. Any combination of hammers can be fired simultaneously, depending on the information to be printed. The print paper is pulled through the printer in discrete steps by the stepper motor 2 one dot row at a time. After each paper advance the print bar 5 reverses direction and moves laterally across the paper to print all of the dots required in that particular dot row. Turnaround is the dead time required to decelerate the print bar 5 in one direction to an instantaneous zero velocity and accelerate it up to speed in the other direction. No print hammers are fired during the turnaround time.

Figure 2:
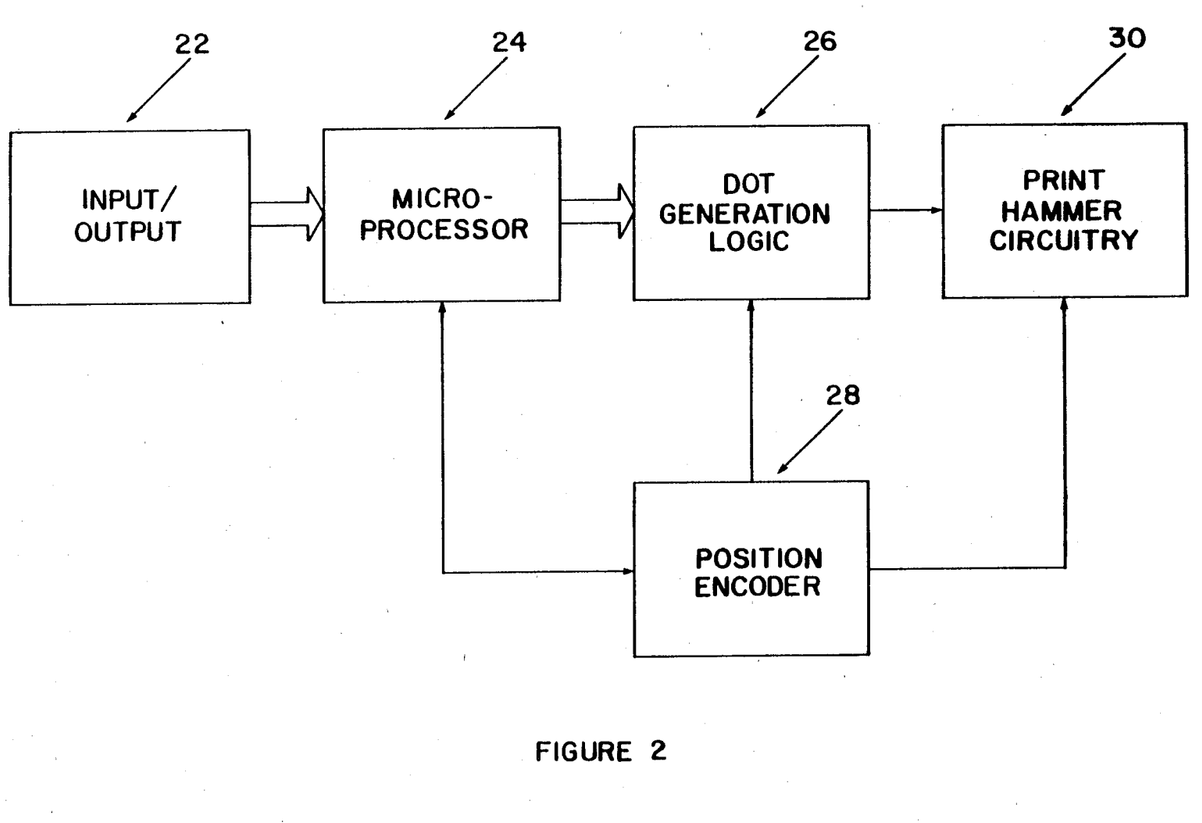
FIG. 2 is a generalized block diagram of the printer electronics of the preferred embodiment shown in FIG. 1.

Now referring to FIGS. 1 and 2, FIG. 2 is a general block diagram of the printer electronics of the printer shown in FIG. 1. The input/output system 22 communicates with a host computer system and is contained in the input/output printed circuit assembly 11. The microprocessor 24 and Dot Generation Logic (DGL) 26 are included on the control board assembly 9. The graphics printed circuit assembly 10 is optional, required only if the host computer system provides the graphics data in vector form rather than in dot image form. The control board assembly 9 may include 64 Kbytes or more of addressable ROM which may be realized by combinations of either 16 K-byte or 32 K-byte ROMs or EROMs.

The microprocessor 24 filters the input data for control and other non-printable characters and then formats the data for the Dot Generation Logic 26 (A microprocessor manufactured by Zilog designated as Z80 may be utilized for this purpose). The microprocessor programs the DGL by providing three bytes called MODE 1, MODE 2 and COMMAND for each dot row; data is formatted into two bytes if text is being processed or one byte if graphics is being processed per character image. The data to be processed is stored in a 2-port 2 Kbyte buffer RAM.

The function of the Dot Generation Logic (DGL) 26 is to map the formatted data bytes from the microprocessor 24 into their appropriate pictorial dot image and to properly pass this information to the print hammer firing circuitry 30. The DGL includes the Dot Processor Chip (DPC), a 2772-bit dynamic main shift register and 132-bit dynamic output shift register, character set ROMs and microprocessor interface.

The print bar position encoder 28 comprises a linear capacitive encoder 8 mounted on the one end of the print bar 5 (as shown in FIG. 1) and the associated circuitry and subsystems contained in the encoder printed circuit assembly 7 (FIG. 1). The function of the position encoder 28 is to provide a print hammer fire signal or strobe to the DGL 26 and the print hammer fire circuitry 30. The position encoder also outputs additional signals representing the direction of motion of the print bar and turnaround or the change in the direction of motion of the print bar.

The design theory behind the DGL is to utilize the fact that a single long shift register can be loaded entirely during the non-printing time that the print bar is changing direction (i.e. turnaround). This long shift register has one storage cell for every dot that could be placed across the print row during a single pass of the print bar. The main shift register has taps spaced evenly along its length: one tap for each hammer in the printer. The number of storage cells between the taps, then, is simply the number of dots a hammer can reach and print in a single pass. Each tap is routed to drive one hammer. Once the main shift register is filled, the main register is clocked once every time the hammers are fired, thus bringing the next printable set of dots underneath the taps in anticipation of the next hammer firing sequence. In addition to this shift register, a state machine, processing logic, and character set dot image ROMs are required.

Figure 5A:
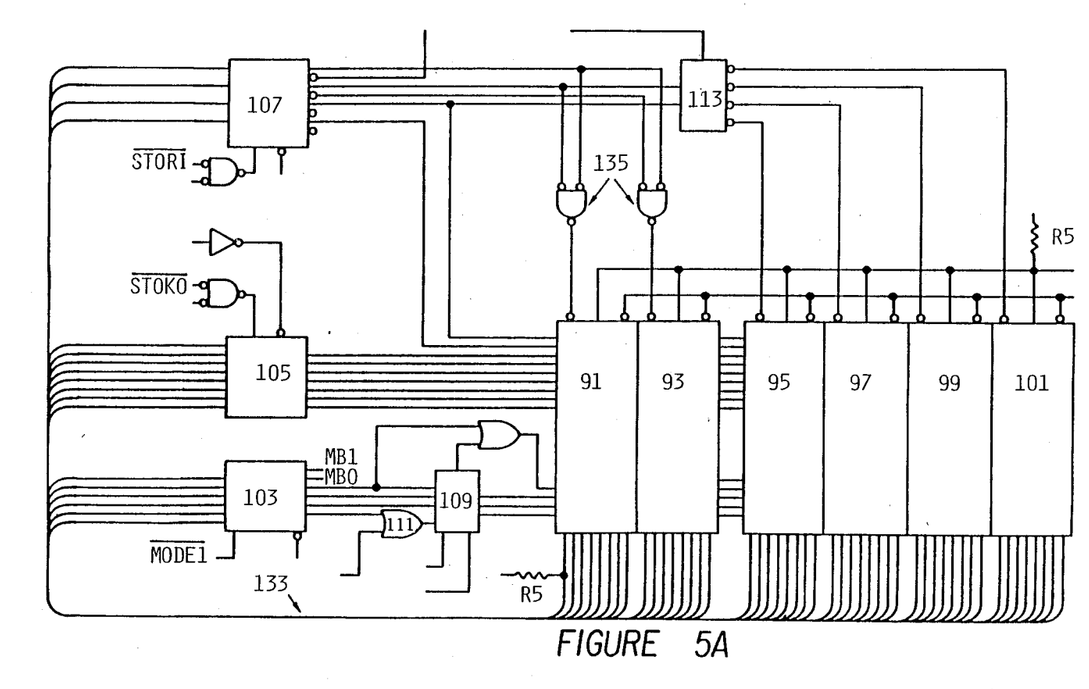
FIGS. 5A and 5B are detailed logic schematics of the Dot Generation Logic.
Figure 5B:
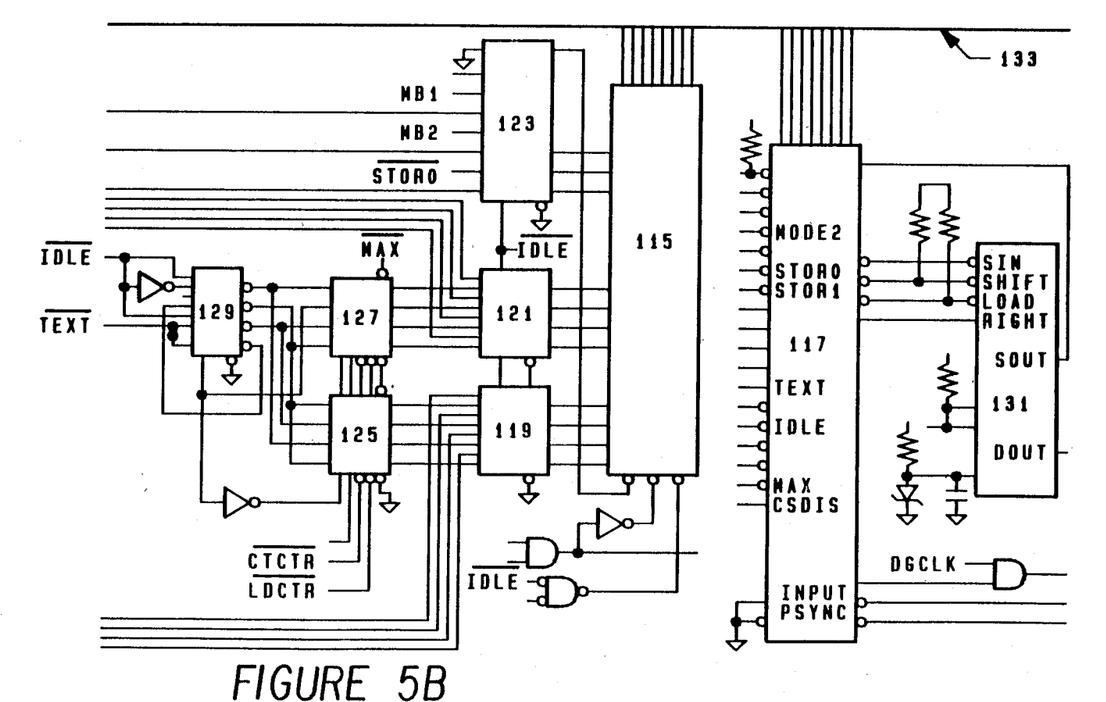

Referring now to FIGS. 5A and 5B, the state machine and processing logic of the DGL comprise a CMOS semicustom gate array, called the Dot Processor Chip 117 (DPC), and the main shift register and the output shift register comprise a NMOS custom VLSI component 131. Six dot image character set ROMs 91, 93, 95, 97, 99 and 101 and the latches and selection logic required to support the ROMs plus a two-port 2 Kbyte buffer RAM 115 that can be accessed by both the microprocessor and the DGL comprise the DGL.

Data to be processed is stored in the two-port 2 Kbyte buffer RAM 115. The RAM 115 is partitioned into four distinct buffers of 512 bytes each to allow multiple line buffering. Double buffering is recommended to ensure full speed printing: one buffer is processed by the DGL while the microprocessor builds the other. The remaining two buffers may be reserved for other uses such as overstriking text or graphics. The DGL, however, converts only one buffer of data to dot image bits per pass of the print bar.

The microprocessor must adhere to specific data structure requirements. Each buffer RAM partition may hold either "text" or graphics information. "Text" is defined as any data that must be mapped through a "character set" ROM. Such ROMs usually contain common alphanumeric data, but may also contain barcode symbols or line draw elements. Graphics is defined as data that is already in dot image form and requires no mapping through character set ROMs.

Figure 3:
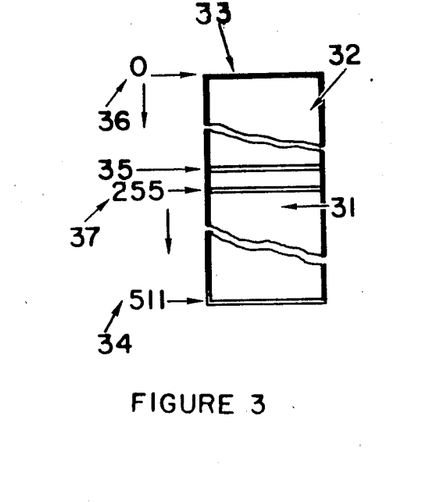
FIG. 3 is a diagram illustrating the arrangement of data bytes in an 512-byte RAM.
Figure 4A:
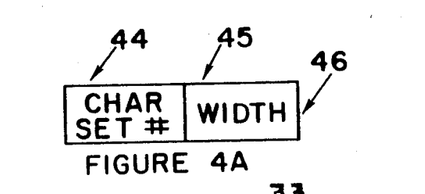
FIGS. 4A and 4B are diagrams illustrating the arrangement of data bits within the data bytes stored in the RAM illustrated in FIG. 3.
Figure 4B:
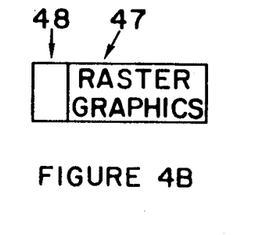

Referring now to FIGS. 3, 4A and 4B, test is stored in a two-byte format. Byte "0" 43 contains the seven-bit ASCII code 42 for the character and an auto-underline bit 41; the auto-underline bit is set if the character is to be underlined. Byte "1" 46 contains a character set number 44 and an encoded dot width 45 for the character. The four-bit width code 45 can be any number from 0 to F (hexadecimal). The DGL internally adds 8 to the encoded width to generate an actual dot width for the character cell. An encoded width of 0 (hexadecimal) is interpreted by the DGL as an actual width of 8 (decimal), and an encoded width of F (hexadecimal) is interpreted by the DGL as an actual width of 23 (decimal).

Within any of the four buffers 33, addresses 0 (36) through 219 (decimal) (35) will hold the byte "0"s for the text to be processed. Addresses 256 (37) through 475 (decimal) will hold the byte "1"s for the text to be processed. Memory locations 220–255 (decimal) and 476 through 511 (decimal) (34) are not accessed. A maximum of 220 characters may be printed on one line. The limit is reached when 16.7-pitch characters are printed in 13.2 inches. The left-most character on the page must be in addresses 0 (36) and 256 (37), and character ordering, left to right, follows upward in the RAM. When fewer than 220 characters are to be printed on the line, ASCII blanks must fill the buffer from the last printable character upward to the limits of addresses 219 and 475.

As graphics data requires no mapping through a character set ROM, it is stored in a single-byte format in addresses 256 (37) through 486 (dec). Memory locations 0 through 255 and 487 through 511 (34) are not accessed. A maximum of 231 bytes may be on one line in the graphics mode. The limit is reached when printing graphics at a density of 140 dots per inch. The left most dot on the page must be placed in the most significant bit 48 of the byte at address 256 (decimal) (37).

The microprocessor programs the DGL using three principal bytes called MODE 1, MODE 2 and COMMAND which are passed in succession to the DGL just after the print bar begins its direction reverse period (i.e., turnaround). Receipt of the COMMAND byte by the DGL initiates the actual data processing sequence and, therefore, the COMMAND byte always follows the MODE bytes. The COMMAND byte comprises 7 active bits. The MODE 1 byte includes the six active bits as follows:

Bits 7,6—These bits specify the partition within the 2 Kbyte buffer RAM that the DGL is directed to process for the next pass of the print bar.

BITS 3-0—Dot Row: When the DGL in processing text, these specify which character dot row is to be processed for the next pass of the print bar.

In the preferred embodiment, the 2772-bit main shift register with 132 taps and printer hammers spaced at an integral multiple of 0.1" supports a horizontal dot density of 210 dots per inch. To accommodate applications where a dot density less than 210 dots per inch is desired, a variable dot grid capability was added to the Dot Processor Chip. This capability allows the same printer under program control to operate at any multiple-of-ten dot density (for example, 70 dots per inch), on a line-by-line basis. If a dot density less than 210 dots per inch is desired, the MODE 2 byte will contain the ones complement of the number of printable dots per hammer.

A variable grid counter with the MODE 2 value interrupts the straightforward serial fill algorithm of the Dot Processor Chip after the programmed number of printable dots are passed into the main shift register. Then it rapidly injects zero bits to pad the main shift register. The number of zero bits is simply the difference between the MODE 2 value and the number of dots per active hammer at 210 dots per inch. For example, consider a 132-hammer printer with a programmable 100 dots per inch grid. For every 10 printable dots passed into the main shift register, 11 zero bits will follow, resynchronizing the printable data to a 21 bit (0.1" when printed) inter-tap boundary. Consider the 33-hammer printer with a 70 dots per inch grid. For every 28 printable dots passed into the main shift register, 56 dummy bits will follow, resynchronizing the printable dots to an 84 bit (0.4" when printed) intertap boundary. This padding process ensures that at the completion of the filling of the main shift register, the valid printable bits will be directly beneath the taps in the main shift register.

Referring to FIGS. 5A and 5B, the address and control lines to the buffer RAM 115 are multiplexed depending upon which system has accessing authority. The DGL has exclusive access when it is actively processing data; at all other times the microprocessor has control. The DGL always accesses the shared RAM 115 sequentially since the order of the RAM 115 data implies a certain image placement on the printed page. An eight-bit counter 125 and 127 provides the sequential addresses. The counter may increment or decrement and can be loaded with several different initial values. If the print bar is moving in the right-to-left direction the counter will count down. The initial values are generated by a single multiplexer circuit 129 indexed by the inputs RIGHT and TEXT from the COMMAND byte provided by the microprocessor and the /IDLE input from the Dot Processor Chip 117. The selection of which memory bank (MB0, MB1) within a buffer RAM 115 is to be processed by the DGL generates the two upper buffer RAM address bits. A signal /STORO from the Dot Processor Chip 117 is used to divide each 512-byte block into 256 two-byte entries. The Dot Processor Chip 117 provides a signal Character Set Disable (CSDIS) to switch between reading the buffer RAM 115 or the dot image memory in the character set ROMs 91, 93, 95, 97, 99 and 101 onto the data bus 133.

Each character set ROM is a standard 128 K-bit ROM or EROM arranged as 16 Kbytes. Two character set ROMs 91 and 93 hold standard density character sets. The remaining four character set ROMs 95, 97, 99 and 101 hold high density character sets which have twice as many dot rows as standard density character sets. Four 128-element standard density or two 128-element high density character sets can be contained in a single 128 K-bit ROM.

A latch 107 holds the character set number from byte "1" for the text element being processed. Decoder 113 and the OR gates 135 form a simple decoder which permits the proper character set ROM to be accessed. Latch 105 holds the seven-bit ASCII code of the specific character being processed.

Latch 103 holds the MODE 1 byte from the microprocessor. The upper two bits indicate to the dot processor chip which buffer RAM 115 partition is to be accessed for this pass of the print bar. The lower four bits indicate which dot row of the character cell (row 0 through row 8) is to be processed. Since every row of every cell can be up to 23 bits wide, three bytes are required to fill a dot row. The three bytes are addressable by multiplying the dot row number by three (via adder 109) and adding a two-bit byte selection code from the dot processor chip to generate the lower five address bits to the character set ROM.

Figure 6:
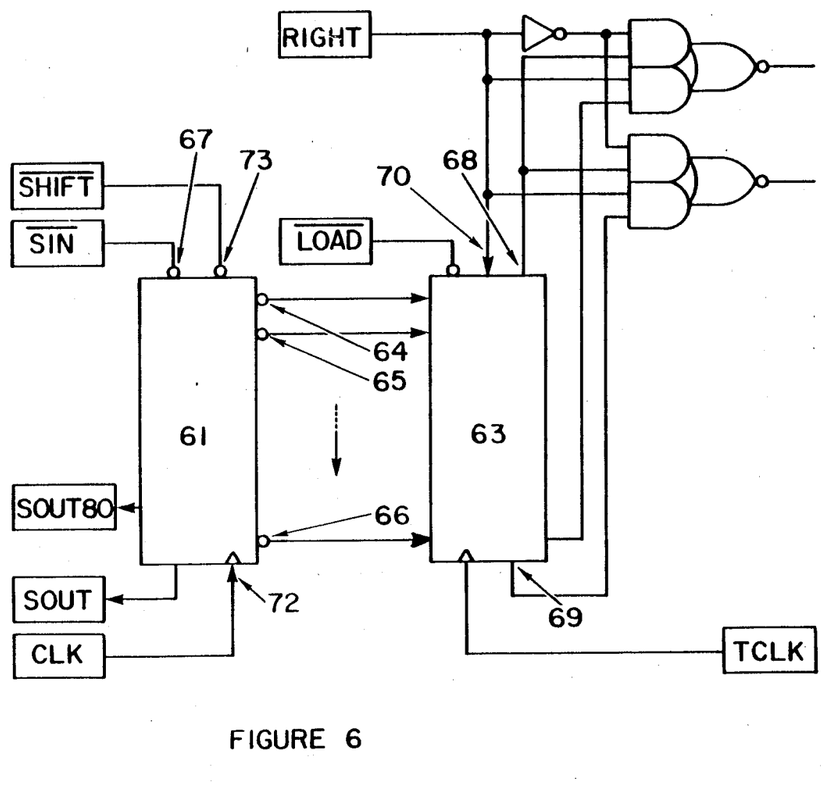
FIG. 6 is a block diagram of the main shift register and output shift register illustrated in FIG. 5B.

Referring now to FIG. 6, the NMOS custom VLSI chip (131 FIG. 5B) comprises a serial input, parallel output main dynamic shift register 61 and a bidirectional parallel loaded, serial output dynamic shift register 63. Parallel output taps physically placed along the main shift register allow simultaneous serial output of the storage cells between each output tap. The dot matrix impact printer illustrated in FIG. 1 has a resolution of 210 dots per inch and is capable of printing across a sheet of paper 13.2 inches wide. The main shift register 61 has one storage cell or logic gate for every dot position (i.e., 2772 bits) and has 132 output taps 64, 65, 66 stationed one every 21 bits. Each of the 132 output taps is eventually routed to a print hammer. The number of bits between each output tap is the number of dots each individual print hammer can print on a single pass of the print bar. The main shift register can be self-refreshed and is controlled by a free running clock input 72 and a ground-true shift enable input 73. The parallel output taps may be routed directly to the individual print hammer drive circuits or may parallel load a bidirectional output shift register.

The 132-bit bidirectional parallel-to-serial output shift register 63 is included on the chip in order to limit the number of package pins and to compensate for the direction of motion of the print bar. The output shift register 63 is controlled by a free running clock and a ground-true load enable line. On each and every rising edge of the clock the output register 63 either shifts or loads depending on the level of the ground-true load enable signal and the right/left direction line 70. The parallel inputs are the outputs of the 132 taps 64, 65, 66 from the main shift register 61.

The preferred embodiment utilizes a unidirectional 2772-bit main shift register 61 and a bidirectional 132-bit output shift register 63. Another embodiment would utilize a bidirectional 2772-bit main shift register 62 (as shown in FIGS. 9D and 9E). As in the unidirectional main shift register, in the bidirectional main shift register 62 the dot data beneath the output taps may be routed directly to the print hammer circuitry or the output taps may parallel load an output shift register 63 (as shown in FIGS. 9D and 9E) in order to limit the number of package pins.

In actual operation, the 2772-bit main shift register 61 is loaded during print bar turnaround with the bit image of the dot row to be printed. Signals generated from the print bar position encoder 28 (FIG. 2) take control of the VLSI chip 131 during the print operation. The primary control signal is the print signal which indicates that the print bar has reached the next successive dot position and that the print hammers are to be fired again. Each time the print hammers are fired, output shift register 63 is parallel-loaded from the main shift register 61 and then the main shift register is clocked once. The next 132 clocks to the output shift register 63 after the print strobe are accompanied by a high level on the ground-true load enable line signal. This permits the contents of the output shift register to be rapidly shifted out to the hammer driver shift register 30 (FIG. 2). These bits represent the actual dots to be printed during the next hammer fire strobe. After the 132 clocks, the ground-true load enable signal returns to its normal low state to perpetually load the output shift register until the next print strobe. If the printer has less than 132 print hammers, such as 33 in the printer shown in FIG. 1, an external divide-by-four circuit (contained within the Dot Processor Chip) loads every fourth bit into an external 33-bit hammer driver shift register. This effectively programs the 2772-bit main shift register to have 33 taps with a 33-bit output shift register. The useful taps along the main shift register appear to be every 84 bits. The VLSI chip 131 may be compatible with 80 character printers by using alternate output taps that effectively truncate the main shift register 61 to 1680 bits and the output shift register 63 to 80 bits.

Figure 7:
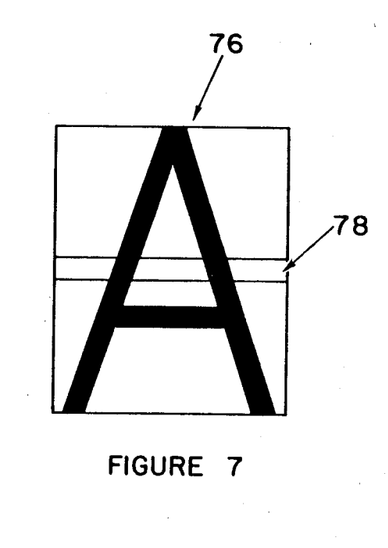
FIG. 7 is a diagram illustrating a single character cell and an individual dot row within that character cell.
Figure 8:
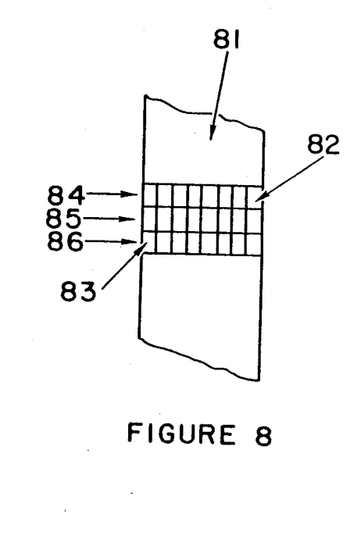
FIG. 8 is a diagram illustrating the arrangement of character set ROM data bits within the 3 bytes that define an individual dot row in a character cell as shown in FIG. 7.

Referring now to FIGS. 7 and 8, the dot procesor chip has strict limits as to the width of the character. Each character cell 76 can be at most 23 bits wide and so the dot processor chip is capable of processing at most 23 bits. Therefore, up to three bytes 84, 85, 86 in the character set ROM 81 are required to hold the dot image for an individual dot row 78. The least significant bit 82 of byte 0 (84) represents the right-most dot position of the dot row 78 and the left-most dot position of the dot row 78 will be contained in either byte 1 or byte 2, depending on the width of the character cell.

Figure 9A:
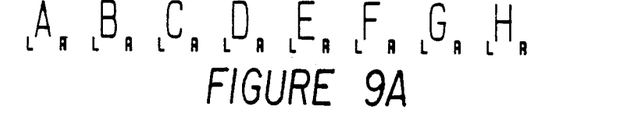
FIG. 9A shows a partial row of characters to be printed.
Figure 9B:
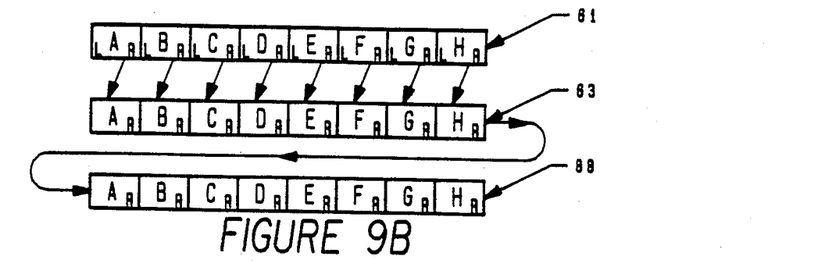
FIG. 9B illustrates the loading of the main shift register and the print hammer buffer shift register when the print bar is printing in a right-to-left direction.
Figure 9C:
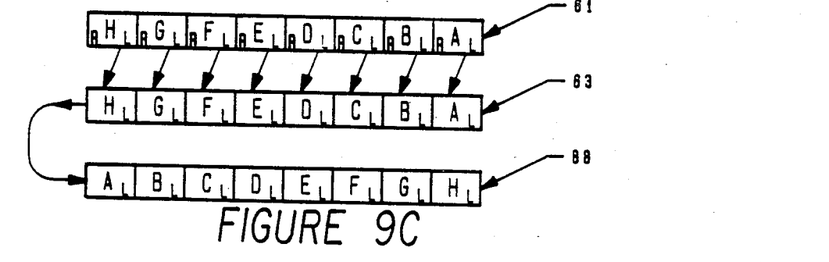
FIG. 9C illustrates the loading of the main shift register and the print hammer buffer shift register when the print bar is printing in a left-to-right direction.
Figure 9D:
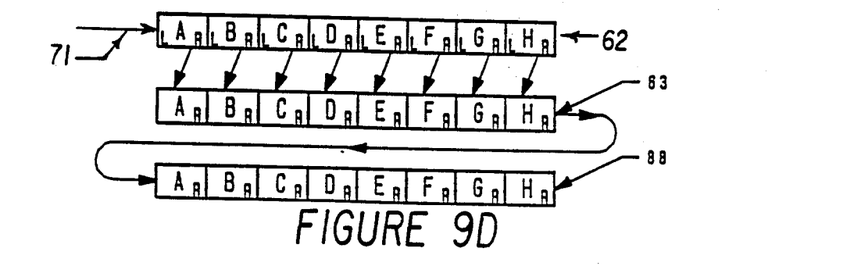
FIG. 9D illustrates the loading of a bidirectional main shift register and the print hammer buffer shift register when the print bar is printing in a right-to-left direction.
Figure 9E:
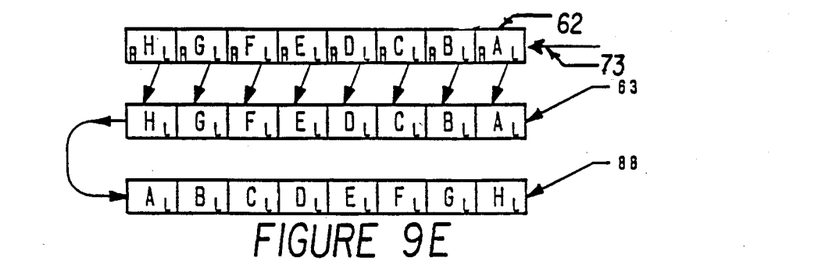
FIG. 9E illustrates the loading of a bidirectional main shift register and the print hammer buffer shift regiser when the print bar is printing in a left-to-right direction.

Referring now to FIGS. 6, 8, 9A, 9B and 9C, the function of the dot processor chip is to load the main shift register 61 with the exact image of the data to be printed on the page during the next pass of the print bar. Consider the partial row of characters shown in FIG. 9A. Each character illustrated comprises a character cell (as shown in FIG. 7) which is a maximum of 23 bits wide—i.e., each dot row can contain up to 23 dots. The subscripts L and R illustrate the left-most and right-most bit respectively in each dot row for each character cell. If the print bar will be printing the next dot row from the right to the left, the bits will be loaded right-most to left-most into the main shift register 61, the output shift register 63 and the print hammer driver shift register 88 in the order shown in FIG. 9B. If the print bar will be printing from the left to the right, the shift registers will be loaded as shown in FIG. 9C.

Referring now to FIGS. 9D and 9E, if a bidirectional main shift register 62 is utilized, it will always be serial loaded in the same order, as indicated by the arrow 71, as the unidirectional main shift register 61 described above is loaded when the print bar will be printing the next dot row from the right to the left. It will be loaded in the opposite direction, as indicated by the arrow 73, when the print bar will be printing from left to right. The bidirectional main shift register 62 will shift once in the same direction as the unidirectional main shift register 61 as each and every print hammer fire strobe is received. The bidirectional shift register 62 uses the same fill algorithm regardless of the direction that the print bar will be printing on its next pass. use of a bidirectional main shift register would reduce the complexity of the main shift register fill algorithm (illustrated in FIG. 10).

In the preferred embodiment, the general processing algorithm utilized by the dot processor chip for character text can be summarized as follows:

Print bar printing from right to left:
Clear the contents of the main shift register by loading with zeros. Address characters in the external buffer RAM 115 (FIG. 5B) from 219 (35 FIG. 3) to 0 (36 FIG. 3). Access dot image bytes (84, 85, 86 FIG. 8) in the character set ROM (81 FIG. 8) for the particular dot row in order byte 0, byte 1, byte 2 (84, 85, 86 FIG. 8), shifting in the least significant bit of each character cell row first. Continue for all characters until the last character (at RAM 115 (FIG. 5B) address 0 (36 FIG. 3)) is completely processed.

Print bar printing from left to right:
Clear the contents of the main shift register by loading with zeros. Then insert a dummy one bit into the main shift register 61. The dummy one bit will act as a stopper flag. Address characters in the external buffer RAM 115 (FIG. 5B) from address 0 (36 FIG. 3) upward. Access dot image bytes (84, 85, 86 FIG. 8) in the character set ROM (81 FIG. 8) for the particular dot row in order byte 2, byte 1, byte 0 (86, 85, 84 FIG. 8) shifting in the most significant bit of each character cell row first. Continue for all characters possible until the one flag stopper bit is clocked out of the main shift register 61.

Figure 10:
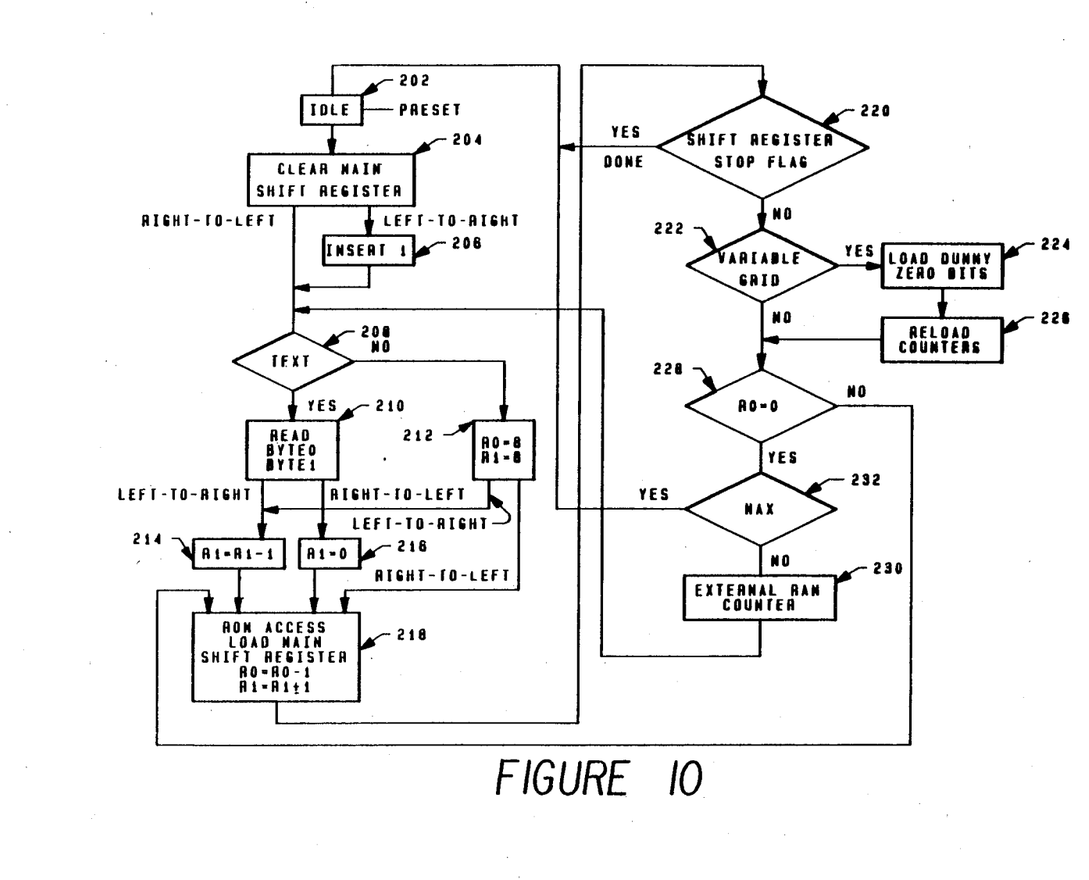
FIG. 10 is a flow chart illustrating the Dot Processor Chip processing algorithms.

The dot processor chip processing flow chart is shown in FIG. 10. Referring now to FIG. 10, the processing by the dot processor chip for the case of text with a standard underlying grid is as follows:

The idle state (202) is the principal non-processing state for the dot processor chip (DPC). During this time the external buffer RAM 115 (FIG. 5B) counter is continuously loaded with some number.

Prior to being loaded with the dot image to be printed on a line, the main shift register must be completely purged of all residual bits from the previous print pass. When the DPC detects the COMMAND byte from the microprocessor, the DPC enters a main shift register clear routine (204). The external buffer RAM counter functions as a loop counter, and the number loaded into the counter in the idle state (202) is large enough to ensure that all 2772 bits of the main shift register are cleared. The main shift register clear routine is complete when a terminal count, MAX, is received from the external buffer RAM counter indicating that the main shift register has been loaded with zeros. When the print bar will be printing in the left-to-right direction, a one flag stopper bit (206) is loaded into the main shift register at the completion of the clear routine.

If the TEXT bit contained in the COMMAND byte is true (208), the processing state for character text (210) is entered. Byte "1" holding the encoded character width in its lower four bits is read from the external buffer RAM 115 (FIG. 5B) and placed on the DGL bus 133 (FIG. 5B). The encoded width is latched inside the DPC while the character set number is held in latch 107 (FIG. 5A). Byte "0" holding the character code (usually ASCII) and the underline bit is read from the external buffer RAM 115 (FIG. 5B) and placed on the DGL bus 133 (FIG. 5B). The underline bit is latched inside the DPC, while the seven-bit character code is held in latch 105 (FIG. 5A). The decoded character cell width is loaded into two internal five-bit counters R0 and R1.

Counter R0 is always used as a running count for the character under processing. It is loaded with the five-bit dot width and counted down. The character is completely processed when R0 reaches zero. Counter R1 is used as a bit position index into the character set ROM for the particular character cell row. R1 counts up from 0 (216) if the print bar will be printing in the right-to-left direction and counts down (214) from the width toward zero if the print bar will be printing from the left-to-right direction. R1 is cleared to zero (216) in preparation for counting upward.

The character set ROM access routine (218) extracts the proper bits from the character set ROM and loads them into the main shift register. Simultaneously, the counter R0 is decremented and the counter R1 is incremented or decremented depending upon the print bar direction. This routine is repeated until R0 (228) indicates that the character cell is complete by reaching zero. One exception to this is when the one flag stopper bit appears (220) which immediately terminates the processing.

When the counter R0 indicates that the character cell being processed is complete by reaching zero, the external buffer RAM counter is clocked up or down (again, depending upon the direction of the print bar) (230). If this was the last character on the line, the external buffer RAM counter would indicate a terminal count (MAX) (232) and control would return to the idle state (202), otherwise processing of the next character begins by reading the TEXT bit (208).

Graphics data is processed similarly to character text except that no character set ROM mapping occurs. If the TEXT bit contained in the COMMAND byte is false (208), both internal counters R0 and R1 are loaded with the constant 8 (212). R1 will remain at 8 or be decremented to 7 (214) depending on the direction of motion of the print bar. If the print bar will be printing from the right to the left, the least significant 3 bits of R1 will count up from 000 to 111 (218), extracting the graphic bits from byte "1" in the external buffer RAM (115 FIG. 5B) and loading them into the main shift register in that order. If the print bar will be printing from the left to the right, the least significant 3 bits in R1 will count down from 111 to 000 (218) extracting the graphic bits and loading them into the main shift register in that order. R0 will count down to zero and act as a progress counter.

One deviation from the normal character processing algorithm concerns variable grid logic. The variable grid logic is generally disabled by may be enabled by the microprocessor by properly programming a MODE 2 byte and setting the proper bit in the COMMAND byte. A standard grid is the dot grid that exactly corresponds to the number of bits between each active output tap within the main shift register. In the case of the printer shown in FIG. 1, there are 84 bits between each output tap and the print hammers print over 0.4" resulting in a standard grid of 210 dots per inch. A variable grid is one that requies fewer bits than that for which the main shift register was designed. When a dot density less than 210 dots per inch is the desired, the MODE 2 byte will contain ones complement of the number of printable dots per hammer. The difference in bits between the taps in the main shift register and those required to meet the desired grid format must be padded with dummy zero bits to preserve continuity and proper alignment within the main shift register. If the variable grid bit in the COMMAND byte is true, the variable grid counter is loaded with the number of printable dots per hammer represented by the MODE 2 byte. As the character set ROM access routine (218) loads individual bits into the main shift register, the variable grid counter is decremented by one for each bit loaded. When the variable grid counter reaches zero (222), the character set ROM access routine (218) is suspended and dummy zero bits are loaded into the main shift register (224) to make up the difference between the programmed variable grid and the standard grid. After the proper number of zero bits are loaded, the variable grid counter is reloaded with the number set by the MODE 2 byte and the character set ROM access routine is re-entered.

Referring now to FIGS. 6, 9B and 9C, the 132 taps 64, 65, 66 within the main shift register 61 parallel-load the 132-bit bidirectional output shift register 63. The contents of the output shift register must be passed to an external print hammer driver shift register 88. The hammer driver shift register 88 has one bit for each print hammer utilized by the printer. Only for the 132-hammer printer are all the 132 output shift register bits passed to the hammer driver shift register. The 132 clocks immediately following the print signal always produce 132 output shift register bits that are directed toward the hammer driver shift register 88. A divider circuit built into the Dot Processor Chip masks out predetermined pulses of the 132 clock pulses from reaching the clock input of the hammer driver shift register. As appropriate for a 33-hammer printer with a 33-bit hammer driver shift register, or a 66-hammer printer with a 66-bit hammer driver shift register, only 33 clocks (1 out of every 4) or 66 clocks (1 out of every 2) are actually passed out to the external hammer driver shift register. The result is that only the proper 33 or 66 dot image bits out of the 132 available are actually loaded into the hammer driver shift register. The dot image bits that appear with no accompanying hammer driver shift register clock are abandoned. The direction of motion of the print bar is critical in determining which output shift register 63 bits are to be discarded and which will be passed to the hammer driver shift register 88. The divider circuit concept allows a single VLSI component with a main shift register, output taps, and an output shift register to be used for a variety of printers with different hammer configurations. A separate VLSI component for every printer type (33, 66, 132 or whatever number of hammers) would eliminate the need for a divider circuit.

We claim:

1. An electronic network comprising:
   a unidirectional shift register having a multiplicity of storage cells for storing a multiplicity of data bits;
   first input means coupled to the unidirectional shift register for serial loading of the unidirectional shift register;
   a plurality of second input means coupled to the unidirectional shift register for inputting control signals for control of the unidirecitonal shift register;
   a plurality of first output means coupled to the unidirectional shift register and evenly dividing said multiplicity of storage cells into a plurality of groups of storage cells, each of said first output means providing serial output of the storage cells contained within an associated group of said plurality of groups, the output of each group is parallel with the output of the remaining groups of said plurality of groups of storage cells;
   a bidirectional shift register having a plurality of storage cells, the plurality of storage cells equal to the plurality of said first output means, said plurality of storage cells for storing a plurality of data bits;
   a plurality of third input means, the plurality of third input means equal to the plurality of first output means, each of said plurality of third input means coupled to one of the plurality of storage cells comprising the bidirectional shift register and to one of the plurality of first output means, the plurality of third input means for providing parallel loading of the bidirectional shift register;
   a plurality of fourth input means coupled to the bidirectional shift register for inputting a plurality of control signals to control the bidirectional shift register; and
   a pair of second output means, each of said pair of second output means coupled to opposite ends of the bidirectional shift register, for selective bidirectional, serial output of said bidirectional shift register.

2. The electronic network as in claim 1 wherein said plurality of second input means comprise:
   input means coupled to the unidirectional shift register for inputting a clock pulse to the unidirectional shift register; and
   input means coupled to the unidirectional shift register for inputting a shift enable pulse to the unidirectional shift register.

3. The electronic network as in claim 2 wherein said storage cells comprise n-channel MOS logic gates.

4. The electronic network as in claim 3 wherein said unidirectional shift register and said bidirectional shift register and said input and output means comprise a very large scale integrated circuit.

5. The electronic network as in claim 4 wherein said unidirectional shift register comprises a 2772-bit shift register and said bidirectional shift register comprises a 132-bit shift register.

6. A dot matrix printer for printing lines of characters and raster graphics on print media, said printer comprising:
   a reciprocating print bar supporting a plurality of print means for printing marks;
   print bar position encoding means for providing print position signals indicative of the position of the print bar and a signal indicative of a change in direction of motion of the print bar and a signal indicative of the direction of motion of the print bar;

programmed data processing means for formating and coding printable data and control data and to provide a first set of control signals;

random access storage means coupled to the programmed data processing means for storing said formatted and coded printable data;

read only storage means for storing a plurality of printable character sets, each character set comprising the dot image of each character contained in said character set;

programmable dot processor means coupled to the read only storage means and to the random access storage means and to the programmed data processing means, said programmable dot processor means responsive to said first set of control signals to retrieve said formatted and coded printable data from said random access storage means to map the coded data into their appropriate dot image form said plurality of character sets stored in said read only storage means, and to provide a multiplicity of sequential data bits representing the pictorial dot image of said coded printable data;

a unidirectional shift register having a multiplicity of storage cells for temporarily storing a multiplicity of data bits;

first input means, coupled to the programmable dot processor means and to the unidirectional shift register, for serial loading said unidirectional shift register with said multiplicity of sequential data bits;

a bidirectional shift register having a plurality of storage cells for temporarily storing a plurality of data bits;

a plurality of output taps coupled to the unidirectional shift register and to the bidirectional shift register, the number of said output taps equal to the number of storage cells comprising said bidirectional shift register, said plurality of output taps disposed along the length of the unidirectional shift register evenly dividing said multiplicity of storage cells into a plurality of groups of storage cells, each of said plurality of output taps coupled to one of said plurality of storage cells comprising said bidirectional shift register, each output tap providing serial output of the storage cells contained within an associated group of said plurality of groups, the output of each group in parallel with the output of each of the remaining groups of said plurality of groups for parallel loading of the bidirectional shift register;

a pair of output means, each of said pair of output means coupled to the opposite ends of the bidirectional shift register, for selective bidirectional, serial output of said second shift register; and a plurality of second input means coupled to the unidirectional shift register and the bidirectional shift register for inputting control signals derived from said first set of control signals and said signals indicative of print bar position, direction of print bar motion and a change in direction of print bar motion, said shift registers responsive to said control signals to output said sequential data bits to said plurality of print means in a predetermined order.

7. The dot matrix printer as in claim 6 wherein said multiplicity of storage cells comprising said unidirectional shift register equals the number of printable dots in one dot row within said line of characters.

8. The dot matrix printer as in claim 7 wherein the number of said plurality of output taps is a multiple of the number of said print means.

9. The dot matrix printer as in claim 8 wherein the programmable dot processor means includes means for selectively precluding predetermined bits output by said bidirectional shift register when the number of said print mean is less than the number of output taps.

10. The dot matrix printer as in claim 9 wherein said number of output taps is 132.

11. The dot matrix printer as in claim 10 wherein the unidirectional shift register comprises a 2772-bit shift register and the bidirectional shift register comprises a 132-bit shift register.

12. The dot matrix printer as in claim 11 wherein:
said dot matrix printer comprises an impact dot matrix printer;
said plurality of print means comprise a plurality of print hammers; and
said programmed data processing means comprises a microprocessor.

13. An electronic network comprising:
a first bidirectional shift register having a multiplicity of storage cells for storing a multiplicity of data bits;
a pair of first input means coupled to the first bidirectional shift register for serial loading of said first bidirectional shift register in both right and left directions;
a plurality of second input means coupled to said first bidirectional shift register for inputting control signals for control of said first bidirectional shift register;
a plurality of first output means coupled to said first bidirectional shift register and evenly dividing said multiplicity of storage cells into a plurality of groups of storage cells, each of said first output means providing serial output of the storage cells contained within an associated group in parallel with the output of the remaining groups of said plurality of groups of storage cells;
a second bidirectional shift register having a plurality of storage cells, the number of storage cells comprising said second bidirectional shift register equal to the number of said first output means, each of said plurality of storage cells coupled to a different one of said plurality of first output means, said plurality of first output means providing parallel loading of said second bidirectional shift register;
a plurality of third input means coupled to said second bidirectional shift register for inputting a plurality of control signals to control said second bidirectional shift register; and
a pair of second output means coupled to said second bidirectional shift register for providing serial output of said second bidirectional shift register in both right and left directions.

* * * * *